US008622805B2

(12) United States Patent
Gomez et al.

(10) Patent No.: US 8,622,805 B2
(45) Date of Patent: Jan. 7, 2014

(54) WAGERING GAME FOR AWARDING POSITIONAL GAME MODIFIERS IN A PLURALITY OF PLAYS

(75) Inventors: Benjamin T. Gomez, Chicago, IL (US); Dylan B. SeLegue, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 622 days.

(21) Appl. No.: 12/911,132

(22) Filed: Oct. 25, 2010

(65) Prior Publication Data

US 2011/0098101 A1 Apr. 28, 2011

Related U.S. Application Data

(60) Provisional application No. 61/255,749, filed on Oct. 28, 2009, provisional application No. 61/299,236, filed on Jan. 28, 2010.

(51) Int. Cl.
*A63F 9/24* (2006.01)
*A63F 13/00* (2006.01)

(52) U.S. Cl.
USPC .................. 463/20; 463/16; 463/25; 463/29; 273/138.1; 273/138.2; 273/143 R

(58) Field of Classification Search
USPC ............ 463/16, 20, 25, 29; 273/138.1, 138.2, 273/143 R
See application file for complete search history.

(56) References Cited

U.S. PATENT DOCUMENTS 4,624,459 A 11/1986 Kaufman .................. 273/143 R
4,837,728 A 6/1989 Barrie et al. .................. 364/412
4,861,041 A 8/1989 Jones et al. .................. 273/292
4,948,134 A 8/1990 Suttle et al. ..................... 273/85
5,116,055 A 5/1992 Tracy ........................ 273/138 A
5,249,800 A 10/1993 Hilgendorf et al. ....... 273/138 A
5,275,400 A 1/1994 Weingardt et al. .............. 463/12
5,280,909 A 1/1994 Tracy ........................ 273/138 A
5,344,144 A 9/1994 Canon ........................ 273/138 A (Continued)

FOREIGN PATENT DOCUMENTS

CA 2 334 546 8/2001 .............. G07F 17/34
DE 195 15 983 A1 11/1996 .............. G07F 17/34

(Continued)

OTHER PUBLICATIONS

Article for "Easy Riches" by Sigma Game, Strictly Slots, 1 page (Aug. 2001).

(Continued)

*Primary Examiner* — Dmitry Suhol
*Assistant Examiner* — Ryan Hsu
(74) *Attorney, Agent, or Firm* — Nixon Peabody LLP

(57) ABSTRACT

A method for conducting a wagering game includes awarding a plurality of positional game modifiers and a plurality of plays of the wagering game. Each play includes a set of assignable positions such that a plurality of sets of assignable positions occur over the plurality of plays, at least some of the assignable positions bearing symbols. The plurality of positional game modifiers are randomly assigned to positions in the plurality of sets of assignable positions. The plurality of plays are displayed on a display device. A processor is used to determine an outcome of each of the plays taking into account any of the positional game modifiers assigned to the positions in the set of assignable positions of each play.

15 Claims, 14 Drawing Sheets

(56) References Cited

U.S. PATENT DOCUMENTS

| | | | | |
|---|---|---|---|---|
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto et al. | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,066 | A | 12/1999 | Moody | 273/292 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,190,255 | B1 | 2/2001 | Thomas et al. | 463/20 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,234,897 | B1 * | 5/2001 | Frohm et al. | 463/20 |
| 6,241,608 | B1 | 6/2001 | Torango | 463/27 |
| 6,251,013 | B1 * | 6/2001 | Bennett | 463/20 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,609,973 | B1 | 8/2003 | Weiss | 463/20 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,694 | B1 | 3/2004 | Nordman | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 6,929,264 | B2 | 8/2005 | Huard et al. | 273/274 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 2001/0004607 | A1 | 6/2001 | Olsen | 463/26 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0064805 | A1 | 4/2003 | Wells | 463/39 |
| 2003/0109306 | A1 | 6/2003 | Karmarkar | 463/40 |
| 2003/0125102 | A1 | 7/2003 | Cannon | 463/20 |
| 2003/0148807 | A1 | 8/2003 | Acres | 463/40 |
| 2003/0148808 | A1 | 8/2003 | Price | 463/27 |
| 2003/0162585 | A1 * | 8/2003 | Bigelow et al. | 463/20 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0002376 | A1 | 1/2004 | Swift et al. | 463/25 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038731 | A1 * | 2/2004 | Englman | 463/25 |
| 2004/0038741 | A1 | 2/2004 | Gauselmann | 463/42 |
| 2004/0048644 | A1 | 3/2004 | Gerrard et al. | 463/16 |
| 2004/0048646 | A1 | 3/2004 | Visocnik | 463/16 |
| 2004/0048649 | A1 | 3/2004 | Peterson et al. | 463/20 |
| 2004/0053666 | A1 | 3/2004 | Vancura | 463/16 |
| 2004/0087359 | A1 * | 5/2004 | Cuddy et al. | 463/20 |
| 2004/0092304 | A1 | 5/2004 | George | 463/29 |
| 2005/0003880 | A1 | 1/2005 | Englman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0130731 | A1 | 6/2005 | Englman et al. | 463/20 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2005/0239542 | A1 | 10/2005 | Olsen | 463/27 |
| 2006/0003829 | A1 | 1/2006 | Thomas | 463/20 |
| 2006/0019737 | A1 | 1/2006 | Yang | 463/19 |

(56) References Cited

U.S. PATENT DOCUMENTS

| | | | | |
|---|---|---|---|---|
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073887 | A1 | 4/2006 | Nguyen et al. | 463/20 |
| 2006/0073889 | A1 | 4/2006 | Edidin et al. | 463/27 |
| 2006/0116201 | A1 | 6/2006 | Gauselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0199634 | A1 * | 9/2006 | Anderson et al. | 463/20 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2007/0213114 | A1 | 9/2007 | Caspers et al. | 463/16 |

FOREIGN PATENT DOCUMENTS

| | | | | |
|---|---|---|---|---|
| DE | 196 24 321 | A1 | 1/1998 | G07F 17/32 |
| EP | 0 521 599 | A1 | 1/1993 | G07F 17/34 |
| GB | 2 153 572 | A | 8/1985 | G07F 17/34 |
| GB | 2 181 589 | A | 4/1987 | G07F 17/34 |
| GB | 2 242 300 | A | 9/1991 | G07F 17/34 |
| GB | 2 313 792 | A | 10/1997 | A63F 5/00 |
| GB | 2 333 880 | A | 8/1999 | G07F 17/34 |
| WO | WO 99/03078 | A1 | 1/1999 | G07F 17/34 |
| WO | WO 99/19037 | A1 | 4/1999 | A63F 9/22 |
| WO | WO 01/33478 | A1 | 5/2001 | G06F 19/00 |
| WO | WO 03/026754 | A1 | 4/2003 | A63F 5/00 |
| WO | WO 03/083789 | A1 | 10/2003 | |
| WO | WO 2005/099425 | A2 | 10/2005 | |
| WO | WO 2006/039349 | A2 | 4/2006 | A63F 9/24 |
| WO | WO 2008/057356 | A2 | 5/2008 | A63F 13/02 |
| WO | WO 2008/156846 | A1 | 12/2008 | A63F 9/24 |
| WO | WO 2009/032150 | A1 | 3/2009 | A63F 9/24 |

OTHER PUBLICATIONS

Article for "Millioniser" by Glenn Haussman, Strictly Slots, pp. 50-53, 4 pages (Mar. 2004).

Product Sheet for "Big Games Safari," IGT, 24 pages (2000).

"New '97 Games," International Gaming & Wagering Business, 23 pages (Mar. 1997).

PCT International Search Report for International Application No. PCT/US2005/08951 dated Nov. 16, 2005 (3 pages).

PCT International Search Report for International Application No. PCT/US2007/023000 mailed May 22, 2008 (2 pages).

PCT International Written Opinion for International Application No. PCT/US2007/023000 mailed May 22, 2008 (6 pages).

* cited by examiner

| Spin No. | Symbol Position No. | | | | | | | | | | | | | | |
|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 |
| 2 | 16 | 17 | 18 | 19 | 20 | 21 | 22 | 23 | 24 | 25 | 26 | 27 | 28 | 29 | 30 |
| 3 | 31 | 32 | 33 | 34 | 35 | 36 | 37 | 38 | 39 | 40 | 41 | 42 | 43 | 44 | 45 |
| 4 | 46 | 47 | 48 | 49 | 50 | 51 | 52 | 53 | 54 | 55 | 56 | 57 | 58 | 59 | 60 |
| 5 | 61 | 62 | 63 | 64 | 65 | 66 | 67 | 68 | 69 | 70 | 71 | 72 | 73 | 74 | 75 |
| 6 | 76 | 77 | 78 | 79 | 80 | 81 | 82 | 83 | 84 | 85 | 86 | 87 | 88 | 89 | 90 |
| 7 | 91 | 92 | 93 | 94 | 95 | 96 | 97 | 98 | 99 | 100 | 101 | 102 | 103 | 104 | 105 |
| 8 | 106 | 107 | 108 | 109 | 110 | 111 | 112 | 113 | 114 | 115 | 116 | 117 | 118 | 119 | 120 |
| 9 | 121 | 122 | 123 | 124 | 125 | 126 | 127 | 128 | 129 | 130 | 131 | 132 | 133 | 134 | 135 |
| 10 | 136 | 137 | 138 | 139 | 140 | 141 | 142 | 143 | 144 | 145 | 146 | 147 | 148 | 149 | 150 |

FIG. 13

WAGERING GAME FOR AWARDING POSITIONAL GAME MODIFIERS IN A PLURALITY OF PLAYS

REFERENCE TO RELATED APPLICATIONS

This application is related to and claims priority to U.S. Provisional Patent Application Ser. No. 61/255,749, filed Oct. 28, 2009, and titled "Wagering Game For Awarding Positional Game Modifiers In A Plurality Of Plays," and to U.S. Provisional Patent Application Ser. No. 61/299,236, filed Jan. 28, 2010, and titled "Wagering Game For Awarding Attributes In A Plurality Of Plays," each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to a wagering game in which positional game modifiers are awarded during a plurality of subsequent plays of the wagering game.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. One type of award provided to the players is a plurality of free plays. The players receive any awards corresponding to winning outcomes achieved during the free plays.

SUMMARY OF THE INVENTION

According to one aspect of the present invention, a method for conducting a wagering game includes awarding a plurality of positional game modifiers and a plurality of plays of the wagering game. Each play includes a set of assignable positions such that a plurality of sets of assignable positions occur over the plurality of plays, at least some of the assignable positions bearing symbols. The plurality of positional game modifiers are randomly assigned to positions in the plurality of sets of assignable positions. The plurality of plays are displayed on a display device. A processor is used to determine an outcome of each of the plays taking into account any of the positional game modifiers assigned to the positions in the set of assignable positions of each play.

According to yet another aspect of the invention, a method for conducting a wagering game includes awarding a progressive award consisting of a plurality of positional game modifiers. The positional game modifiers are assigned to a total number of symbol-bearing positions achieved during a plurality of awarded free plays. The plurality of free plays are displayed on a display. An outcome is determined for each of the free plays, the outcome being based on any positional game modifiers assigned to symbol-bearing positions of each of the free plays.

According to yet another aspect of the invention, a gaming system includes a wager input device, which is configured to receive a wager from a player for playing a wagering game, a display, and one or more processors. The display is configured to display a plurality of plays of the wagering game, each play including a set of assignable positions such that a plurality of sets of assignable positions occur over the plurality of plays. At least some of the assignable positions bear symbols. The one or more processors are communicatively coupled to the display and at least one of the processors is operative to award the plurality of plays and a plurality of positional game modifiers. The at least one processor is further operative to randomly assign the plurality of positional game modifiers to positions in the plurality of sets of assignable positions, and to determine an outcome of each of the plays. The outcome is determined taking into account any of the positional game modifiers assigned to the positions in the set of assignable positions of each play.

According to yet another aspect of the invention, a computer program product includes a computer readable medium having an instruction set borne thereby, the instruction set being configured to cause, upon execution by a controller, a number of acts. The acts include awarding a plurality of positional game modifiers and a plurality of plays of the wagering game. Each play includes a set of assignable positions such that a plurality of sets of assignable positions occur over the plurality of plays, at least some of the assignable positions bearing symbols. The acts include randomly assigning the plurality of positional game modifiers to positions in the plurality of sets of assignable positions and displaying, on a display device, the plurality of plays. The acts further includes determining an outcome of each of the plays taking into account any of the positional game modifiers assigned to the positions in the set of assignable positions of each play.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 13 illustrates the assignment of the extra wild positions for a plurality of free spins.

Figure 1:
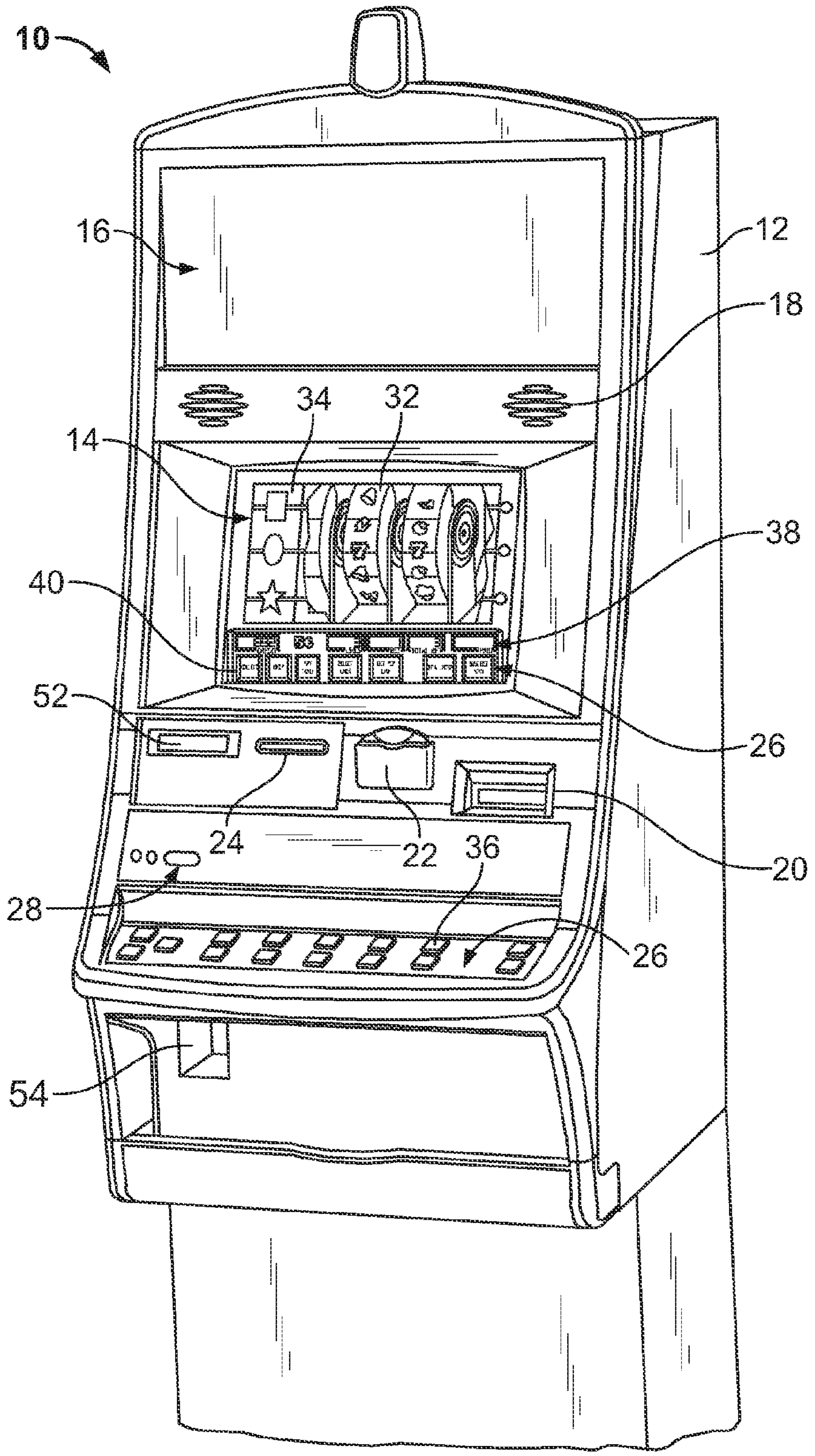
FIG. 1 (Prior Art)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted at the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life"

images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
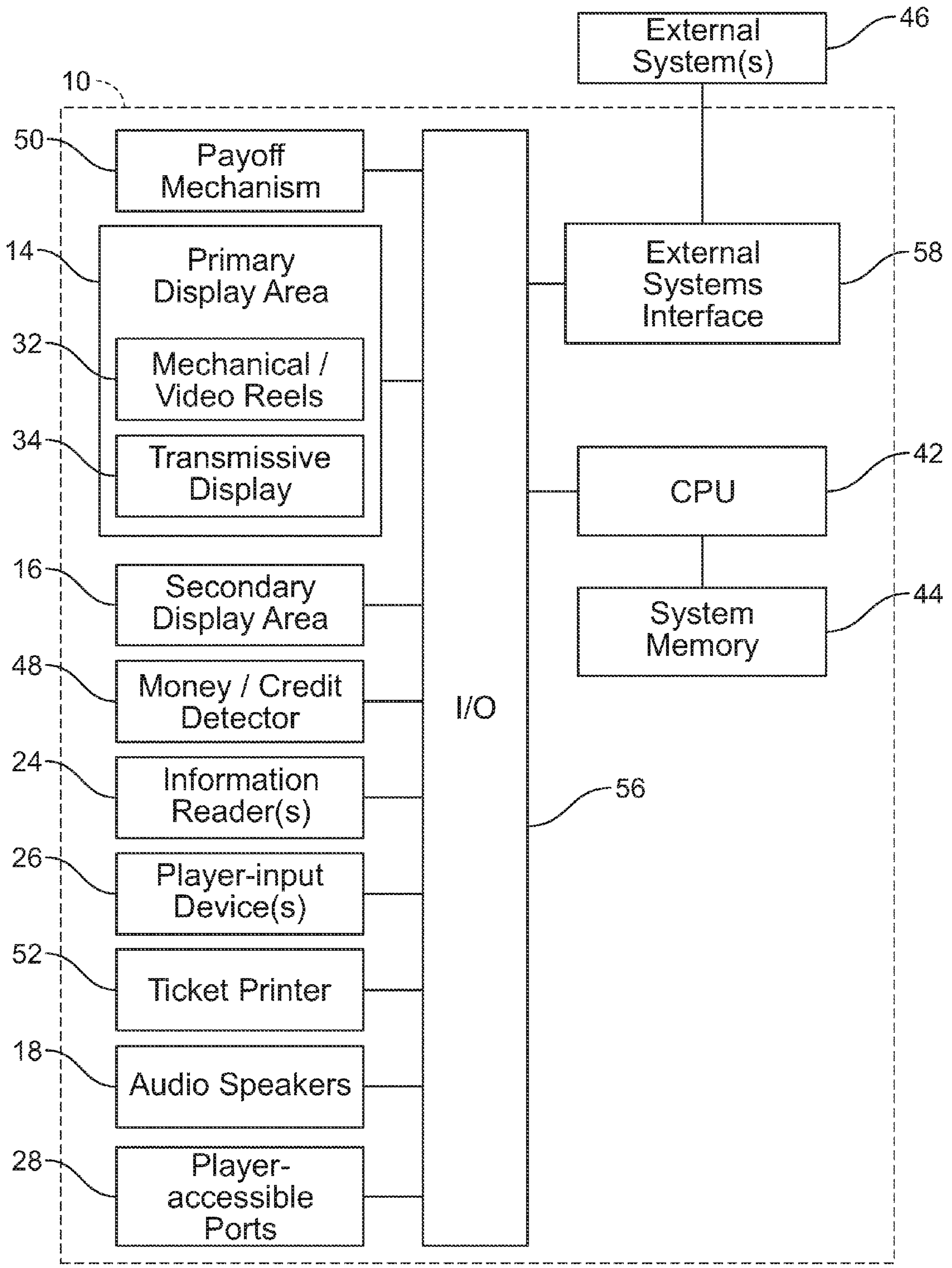
FIG. 2 (Prior Art)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
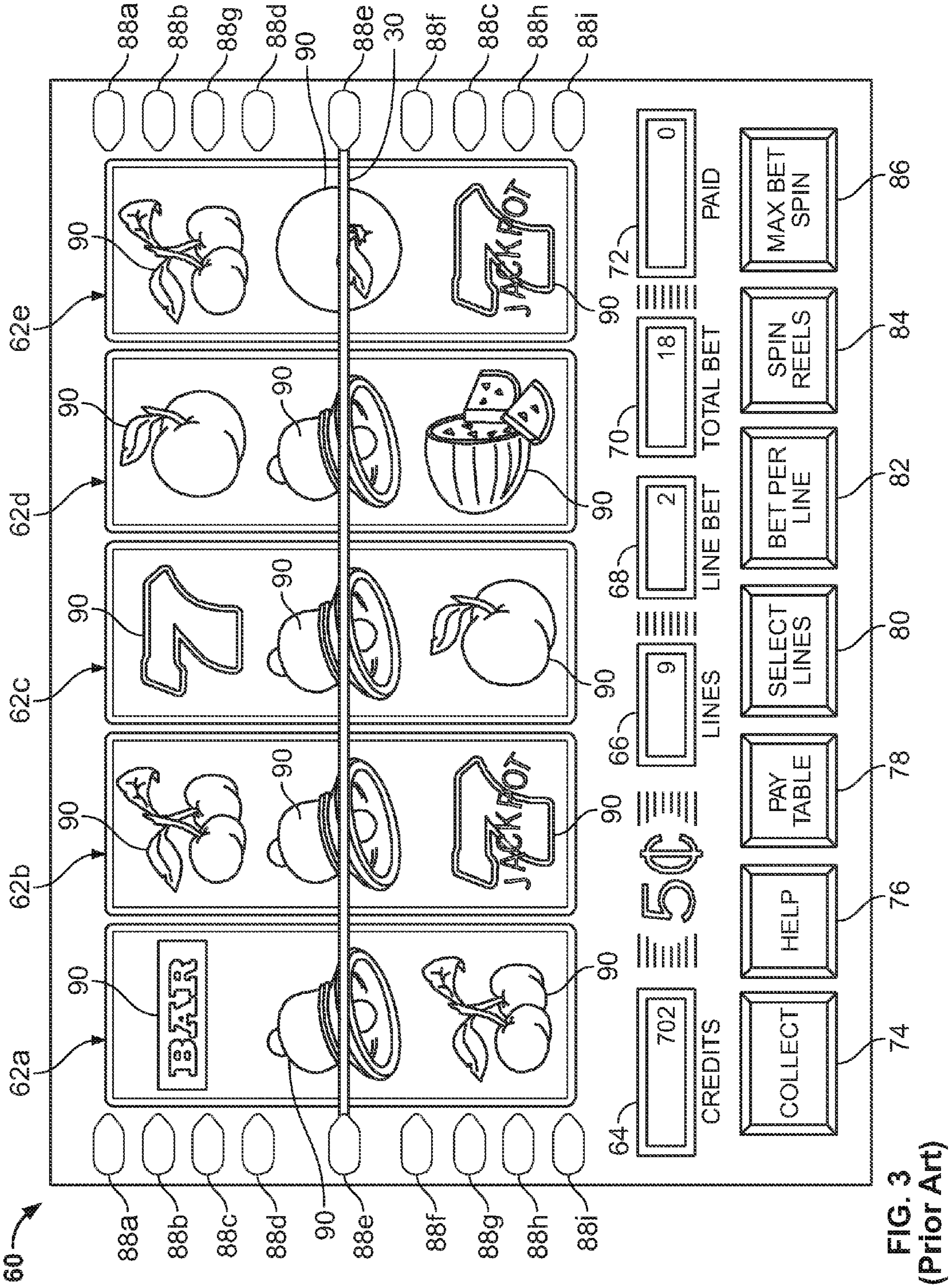
FIG. 3 (Prior Art)
FIG. 3 is an image of an exemplary basic-game screen of a wagering game displayed at a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to process the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device, changing a magnetic state of a ferromagnetic surface of a magneto-optical disc storage device, or changing a state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play at the terminal; a "lines" meter 66 for displaying a number of paylines to be played by a player at the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used at gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
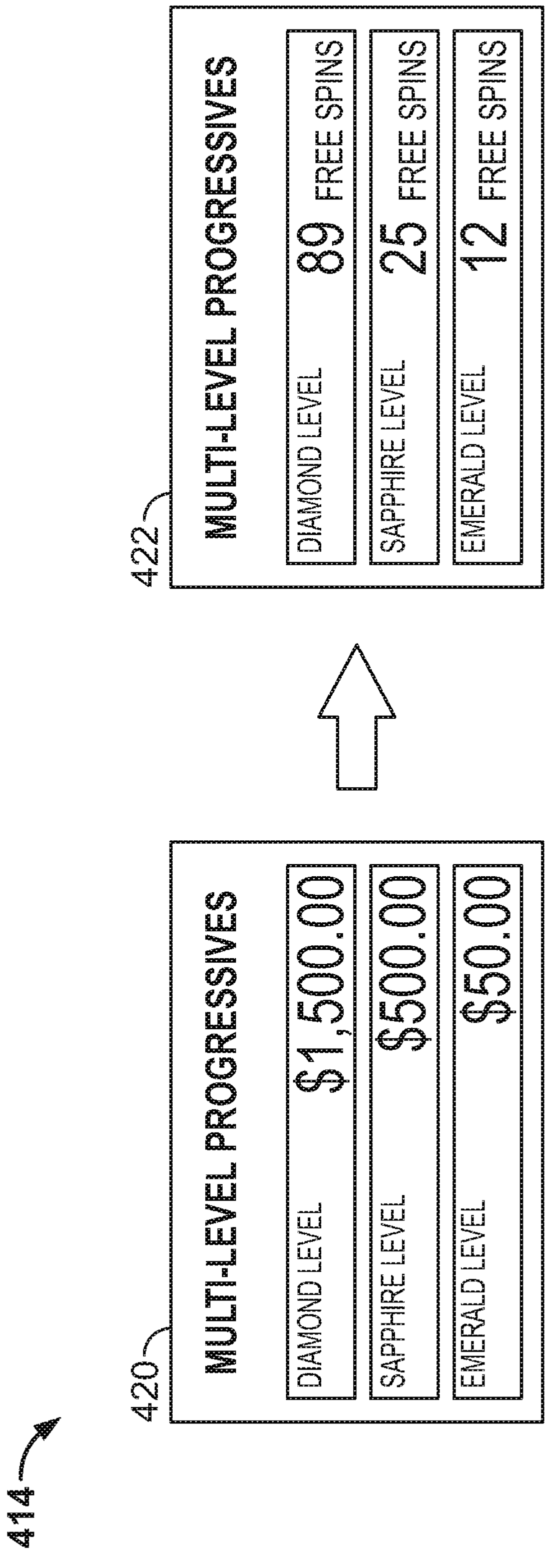
FIG. 4 is an image of an exemplary screen displaying cash-values of a multi-level progressive award transformed to free spins, according to an embodiment of the present invention.

Referring now to FIG. 4, a game screen on a display area 414 shows a progressive award that is transformed from a cash-based progressive award 420 to a non-cash progressive award 422 of substantially equal value. Specifically, the progressive award is a multi-level progressive award that has three levels: a diamond level, a sapphire level, and an emerald level. The diamond level has a $1,500.00 cash value, the sapphire level has a $500.00 cash value, and the emerald level has a $50.00 cash value.

The progressive award generally increments in response to play of the wagering game. For example, the progressive award increases in response to wagers received from a plurality of players on a bank of gaming machines.

The cash values of the progressive award are determined, generally, by a progressive controller that meters everything in cash. The progressive controller can be in accordance with the controller described above in reference to FIG. 2. In response to a triggering condition, the progressive controller performs an algorithm that transforms the cash values to a specified non-cash game item. According to an exemplary embodiment, the non-cash game item can be one or more game parameters.

Referring now back to the triggering condition, the triggering condition can be any triggering condition, including a mystery trigger, a displayed triggering event, or any other applicable condition. The triggering condition can trigger the transformation of the progressive award cash values to the same or a different game item. For example, achieving a specific symbol combination during a first occurrence may trigger the transformation to a free spins item, and achieving the same symbol combination later, during a second occurrence, may trigger the transformation to an extra wilds item. In another example, the same triggering event causes the cash value to transform to (a) a game item randomly selected from multiple game items, (b) a game item selected by the player from multiple game items, and/or (c) an associated game item. In yet another example, different triggering events can cause the cash value to transform to different game items associated with respective ones of the triggering events.

The triggering condition can occur in the current wagering game, at the gaming terminal at which the current player is conducting the wagering game, or in other wagering games that are conducted by other players at other gaming terminals. For example, player A is conducting a wagering game A at a gaming terminal A, and player B is conducting a wagering game B at a gaming terminal B. A triggering condition associated with player B (during wagering game B at gaming terminal B) can trigger the transformation of the cash values of the progressive award for player A (during wagering game A at gaming terminal A) to free spins (e.g., during a first occurrence of the triggering condition) or to extra wilds (e.g., during a second occurrence of the triggering condition). Alternatively, multiple triggering conditions can occur during the same wagering game.

In another example, the triggering condition occurs only on the same wagering game in which the transformation occurs. For example, the triggering condition associated with player B (during wagering game B at gaming terminal B) only displays the transformation of the cash values to the game items for player B (not for player A). Optionally, the triggering condition associated with player B causes the displaying of the transformation of the cash values to the game items for every player that is on a gaming system. Optionally yet, the triggering condition associated with player B causes the displaying of the transformation to a selected number of players on the gaming system, wherein the selected number of players is based on some variable (e.g., only players that have been wagering a certain amount within a specific period of time, only players whose birthdates are in a specific month, only players that have achieved a specific outcome in the present wagering game or in previous wagering games, etc.).

As illustrated, the cash value of each progressive level is transformed to a number of free spins. The diamond level cash value of $1,500.00 is transformed to 89 free spins, the sapphire level cash value of $500.00 is transformed to 25 free spins, and the emerald level cash value of $50.00 is transformed to 12 free spins. Both, the cash values and the free spins values are simultaneously displayed to the player. Alternatively, the cash values and the free spins values are displayed to the player one at a time.

According to one exemplary embodiment, non-cash values corresponding to cash-values of the progressive award are truncated to obtain whole number non-cash game items. For example purposes, the values listed below are used to illustrate the truncated approach:

| Cash Value Meter (thresholds) | Extra Wilds Meter | Free Spins Meter |
|---|---|---|
| $16 | — | 5 |
| $17.25 | 3 | — |
| $18 | — | 6 |
| $18.50 | 4 | — |

If the cash value meter has a cash value, for example, of $17.42 (which is between the $17.25 threshold corresponding to 3 extra wilds and the $18.50 threshold corresponding to 4 extra wilds), the display would show the following truncated values for the extra wilds meter and the free spins meter:

| Cash Value Meter | Extra Wilds Meter | Free Spins Meter |
|---|---|---|
| $17.42 | 3 | 5 |

Thus, the transformation from the cash value to the respective non-cash item is performed by using the closest lower value of the non-cash item that is deemed substantially equivalent to the current cash value. In other words, for example, instead of awarding a player a non-cash item of 3.2125 extra wilds (which would not be practical) as the exact equivalent to a cash value of $17.42, the non-cash item is truncated to 3 extra wilds.

The difference in cash value between the equivalent cash value of the truncated game item and the actual cash value meter is added to the cash value meter when the progressive award is reset. For example, if the game awards extra wilds, the difference in cash value between $17.25 (the equivalent cash value of 3 extra wilds) and $17.42 (the actual cash value meter) is $0.17. When resetting the progressive award to its base value, this amount is added to the base value. For example, assuming that the base value is $10, the progressive award will be $10.17 upon resetting.

Similarly, if the game awards free spins, the difference in cash value between $16 (the equivalent cash value of 5 free spins) and $17.42 (the actual cash value meter) is $1.42. Thus, upon resetting, the exemplary base value of the progressive award will be $11.42 (according to the above exemplary values).

According to another exemplary embodiment, a weighted table of probability determines whether to award the closest higher or lower value such that an expected value (EV) worth the current cash value is achieved. To illustrate this approach, the following exemplary values are used for a cash value of $17.42:

| Free Spins Meter | Probability |
|---|---|
| 5 | 0.14 |
| 6 | 0.86 |

According to these probability odds, the player has a much higher chance of receiving 6 free spins. Thus, the player who last saw the free spins meter at "5", is likely to be happy if he or she is awarded "6" free spins (i.e., more than what the player was expecting).

According to another embodiment, instead of truncating, non-cash values corresponding to cash-values of the progressive award are rounded up to obtain whole number non-cash game items. The rounding approach ensures that a player will not receive less than what was earned. For example, according to this embodiment, if the player may have earned 8.3 extra wilds, the value is rounded to 9 extra wilds.

Figure 5:
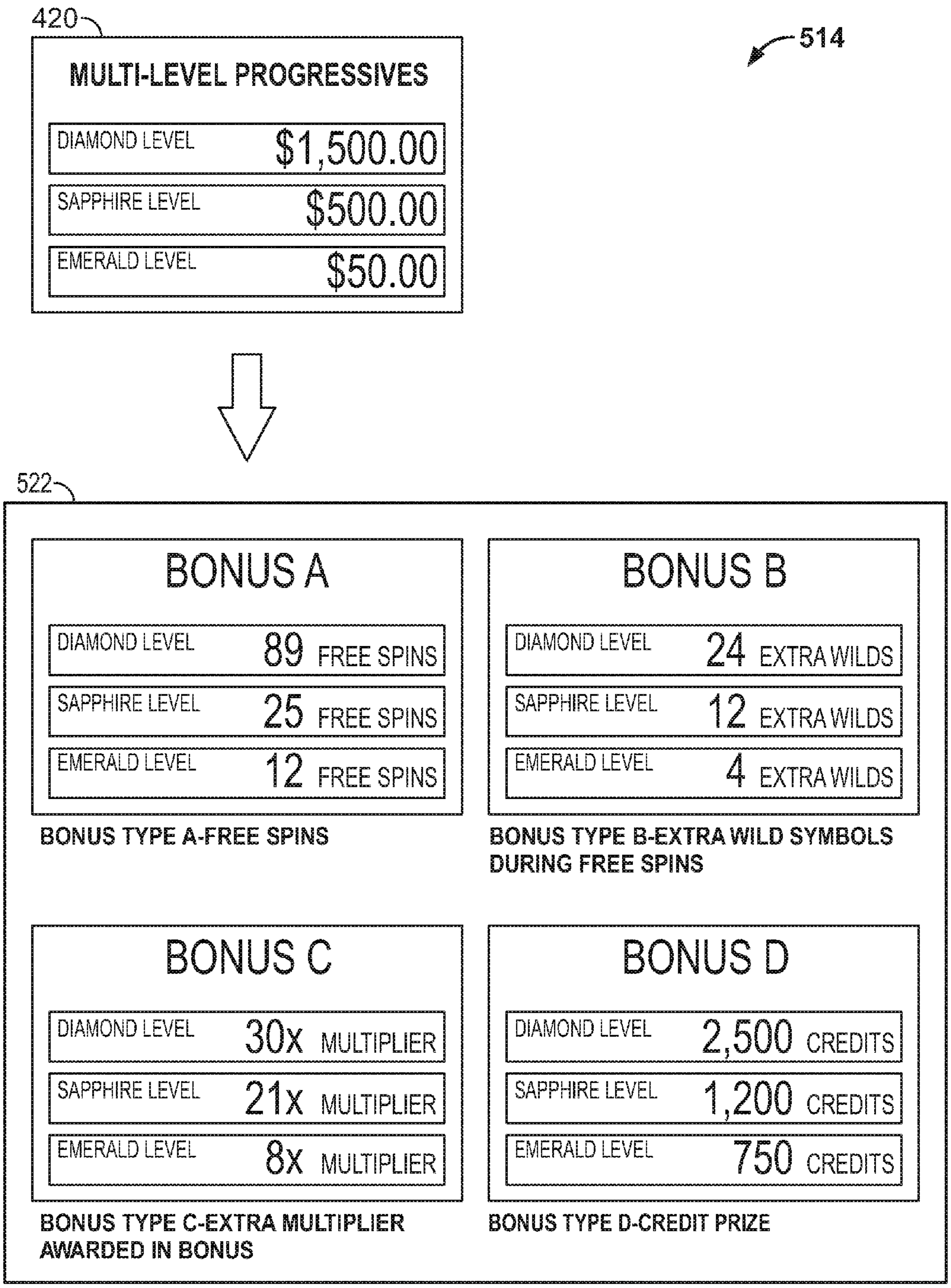
FIG. 5 illustrates the multi-level progressive award transformed to multiple different game items.

Referring to FIG. 5, a game screen on a display area 514 shows a progressive award that is transformed from the cash-based progressive award 420 to multiple non-cash game items 522. Specifically, the progressive award is transformed to four different types of game items, which include a Bonus A free spins item, a Bonus B extra wilds item, a Bonus C multiplier item, and a Bonus D credits item. For each of the different types of game items, a substantially equal value is selected for awarding if a triggering event occurs. For example, a determination is made that 24 extra wilds are substantially equal in value to $1,500.00, 12 extra wilds are substantially equal in value to $500.00, and 4 extra wilds are substantially equal in value to $50.00. Similar determinations are made with respect to Bonus C and Bonus D.

Figure 6:
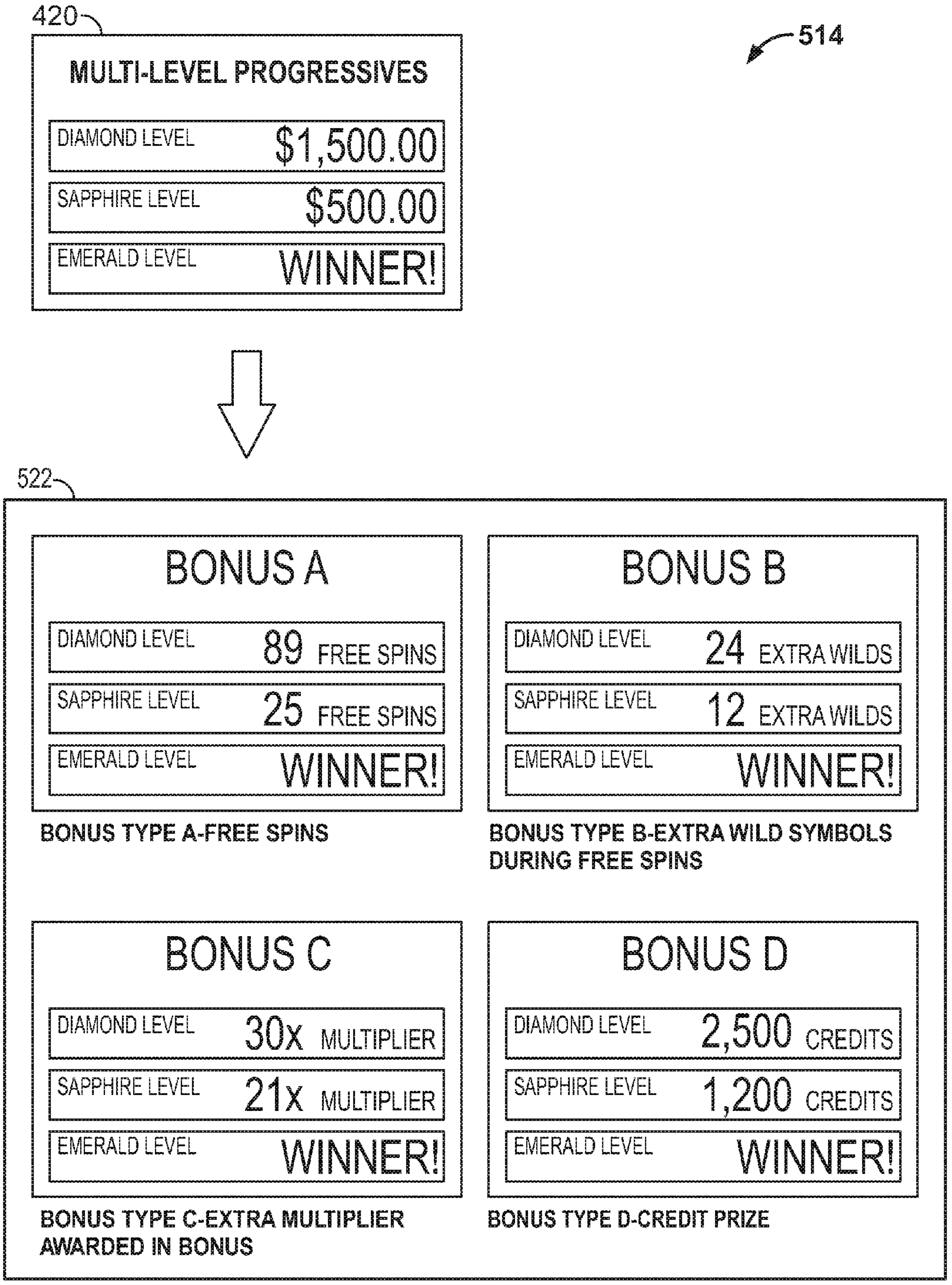
FIG. 6 illustrates a winning outcome in which a progressive level of the multi-level progressive award is achieved.

Referring to FIG. 6, a game screen on the display area 514 shows that a triggering event in the form of a winning outcome has been achieved and the emerald level progressive award is awarded. The player is notified that a “WINNER” has been determined for the cash-based progressive award 420, and the “WINNER” notification is replicated for each of the four different types of game items 522.

The determination regarding which type of game items are awarded can be a random determination or a player-selected determination. For example, the player may be awarded (on a random basis) Bonus C multiplier items. Alternatively, the player can select the type of items that he or she would like to receive. For example, the player can select Bonus A free spins items, hoping that the free spins would yield much more than the $50 cash value. The player selection can be performed before or after the “WINNER” has been determined.

Figure 7:
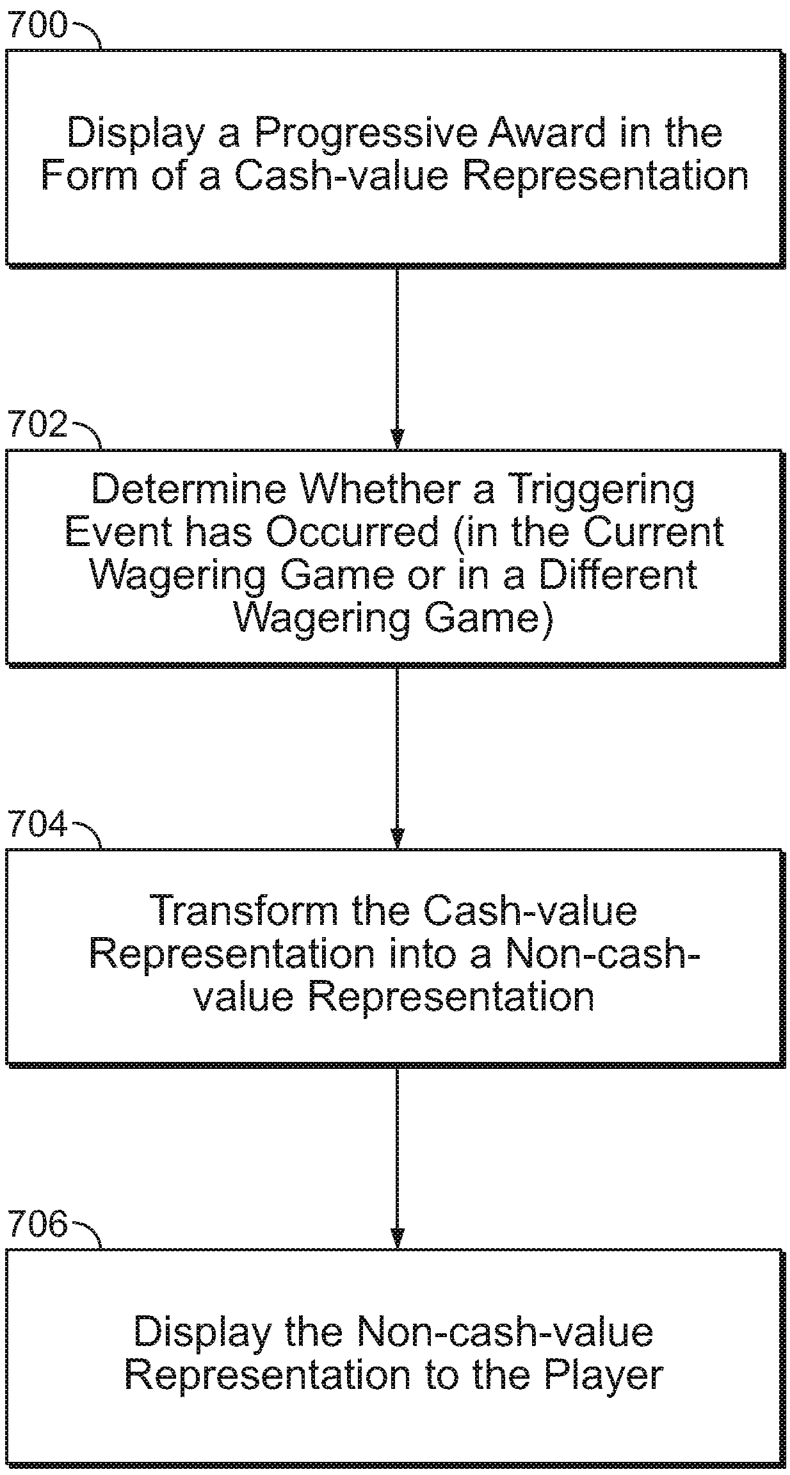
FIG. 7 is a flowchart for an algorithm that corresponds to instructions executed by a controller in accord with at least some aspects of the disclosed concepts.

FIG. 7, described by way of example above, represents one algorithm that corresponds to at least some instructions executed by the controller 42 and/or external systems 46 in FIG. 2 to perform the above described functions associated with the disclosed concepts. For example, a progressive award is displayed in the form of a cash-value representation (700). The controller 42 determines whether a triggering event has occurred, e.g., in the current wagering game or in a different wagering game (702). If the triggering event has occurred, the cash-value representation is transformed into a non-cash value representation (704), which is displayed to the player (706).

Figure 8:
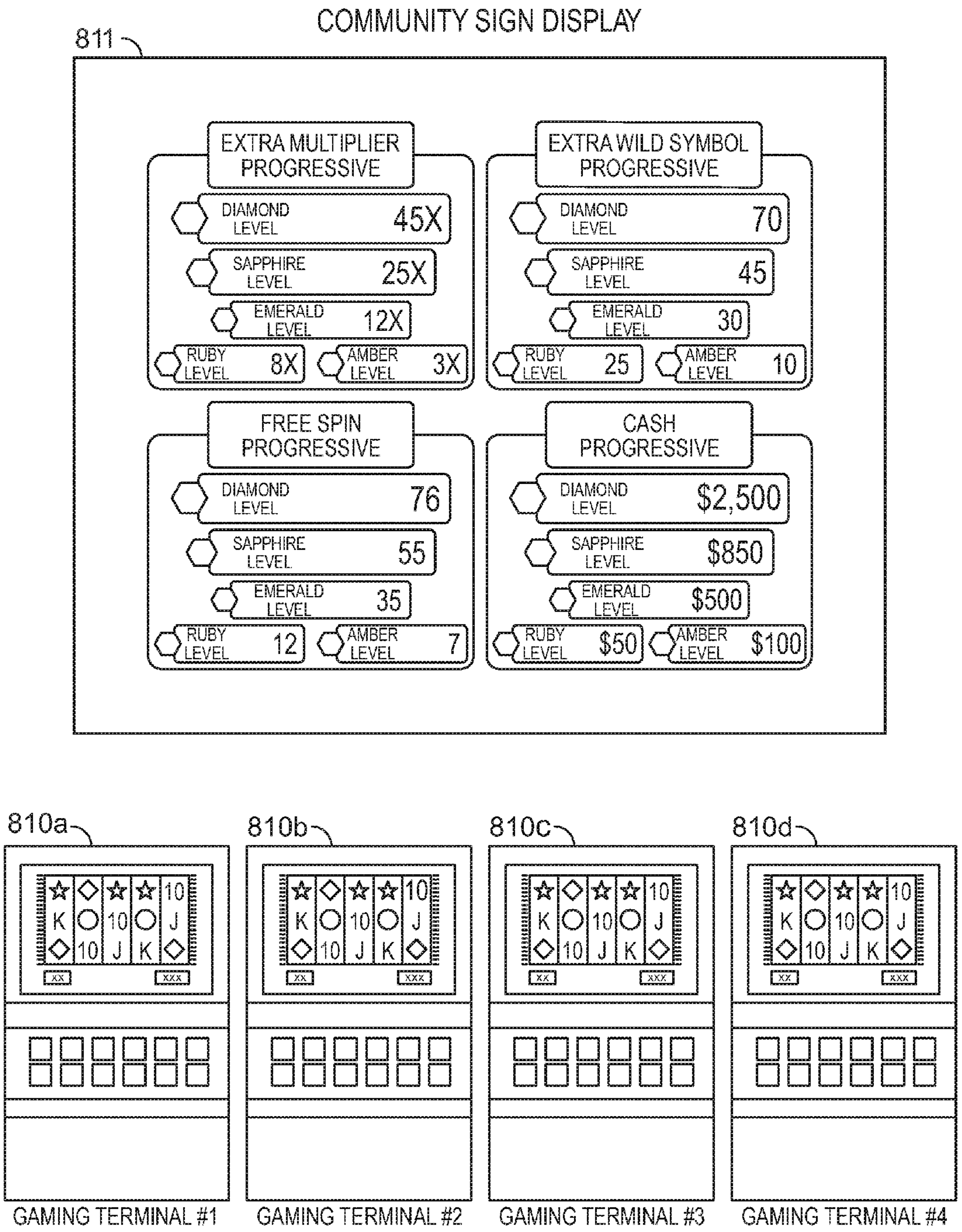
FIG. 8 illustrates a gaming system having a plurality of gaming terminals and a community sign display for presenting a community event, according to an embodiment of the present invention.

Referring to FIG. 8, a bank of gaming machines 810*a*-810*d* (Gaming Terminals 1-4) are located in front of a large community sign display 811 to present a community event. For example, the community event in this case is a cash-based progressive that is converted into other non-cash-based progressives, which are displayed simultaneously to players on the bank of gaming machines 810*a*-810*d*.

Figure 9:
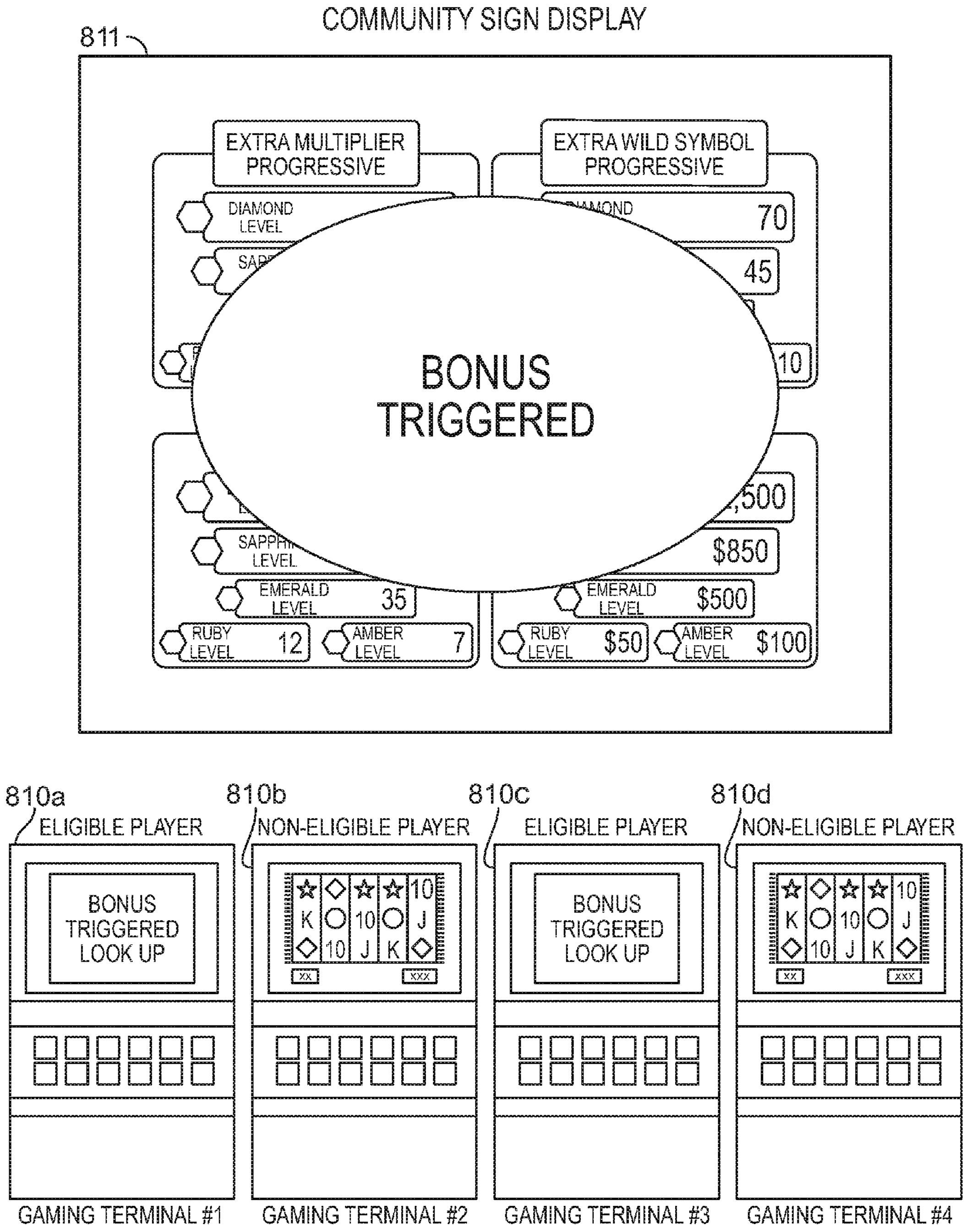
FIG. 9 illustrates the gaming system of FIG. 8 showing a notification that a progressive event has been randomly triggered.

Referring to FIG. 9, players must make a specified wager to become eligible for the community event. As such, the community sign display 811 provides a notification when the community event has been randomly triggered, e.g., “Bonus Triggered.” Furthermore, the games of all eligible players are interrupted to notify the eligible players that one of them is about to be awarded a converted progressive award. In the current example, there are only two eligible players—one eligible player at Gaming Terminal #1 810*a* and one eligible player at Gaming Terminal #3 810*c*.

Figure 10:
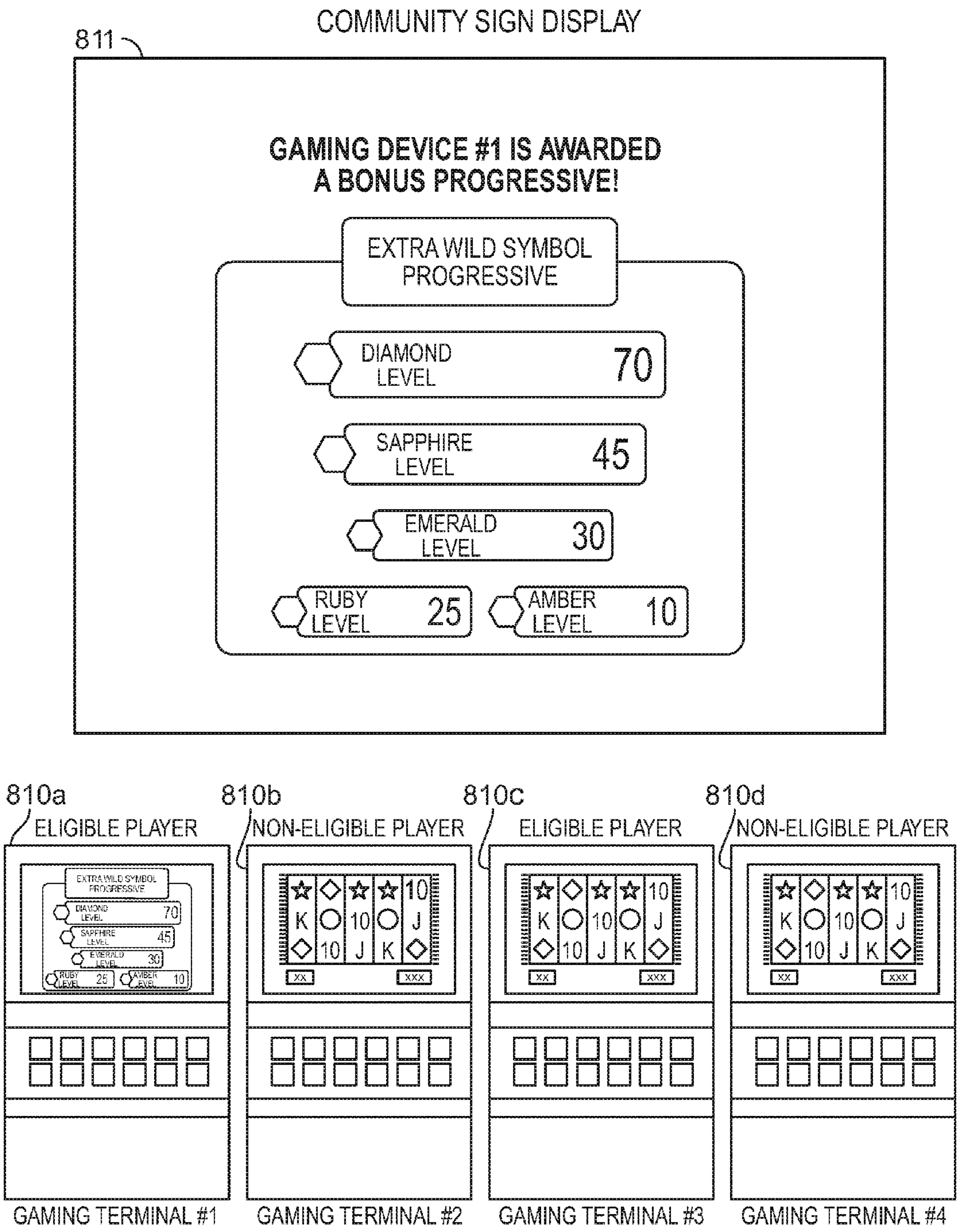
FIG. 10 illustrates the gaming system of FIG. 8 showing a notification that the progressive event has been awarded to one of the eligible players.

Referring to FIG. 10, the community sign display notifies all eligible players that one of them has been awarded the converted progressive award. According to this example, the eligible player at Gaming Terminal #1 810*a* is informed that he or she is going to play a bonus game for a chance to win one of the levels in the converted progressive. The Gaming Terminal #3 810*c*, at which the other eligible player has been playing, goes back to normal play because the player has not been awarded the converted progressive award.

Figure 11:
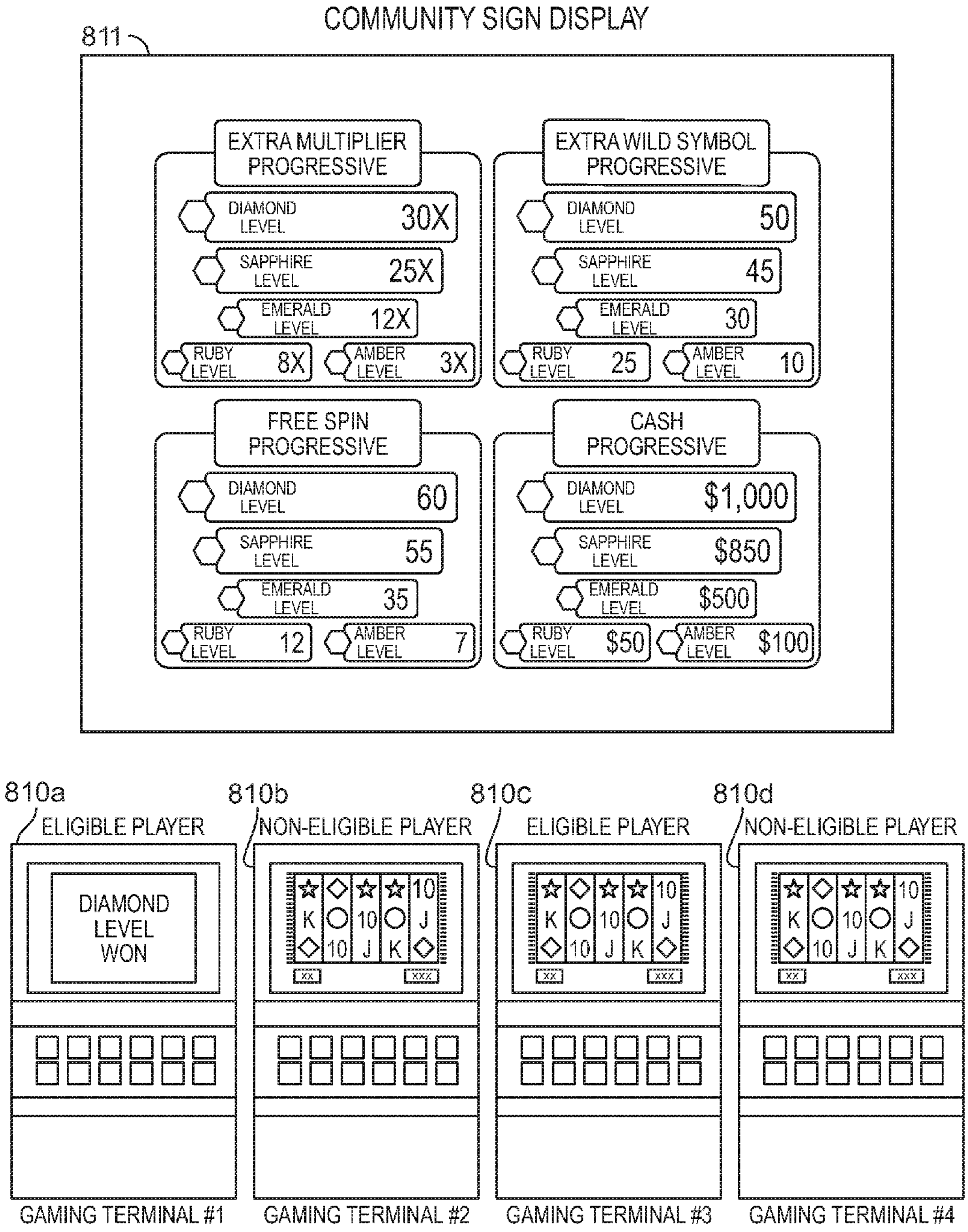
FIG. 11 illustrates the gaming system of FIG. 8 showing a notification that a progressive award has been awarded to one of the eligible players.

Referring to FIG. 11, the player at Gaming Terminal #1 810*a* has won a Diamond level progressive award. Accordingly, the community sign display 811 now shows all the Diamond level awards at an initial reset value. For example, the cash value of $2,500 is now reset to $1,000, the extra multiplier progressive of 45× is now reset to 30×, the extra wild symbol progressive of 70 is now 50, and the free spin progressive of 76 is now 60.

Referring now in more detail to some exemplary game parameters, the game parameter can be one or more of free spins, positional game modifiers (e.g., multipliers, extra wilds, non-wild special symbols, and payline activator symbols), picks, rolls of dice, loyalty points, wins, time, pooper savers, games, cascading events, spinning streaks, random bonuses, building type, nudges, random mystery enhancements, reject/accept options, locked reels, and bonus games.

Free Spins

A free spins game parameter generally awards one or more free spins of the reels to the player in addition to spin(s) received in response to a wager. The number of free spins is the progressing variable of the free spins game parameter. The reels used during the free spins may have the same or different number, composition, and arrangement of reel symbols as the reels used during the base wagering game.

Positional Game Modifiers—Multipliers

According to one positional game modifier, a multiplier game parameter generally enhances a winning outcome by multiplying a payout for the winning outcome by a certain multiplier value. For example, if the multiplier is a 2× multiplier, and the winning outcome is 10 credits, the enhanced winning outcome is 20 credits (100 credits×2). The number of multipliers (e.g., 10 multipliers of 2×) and/or the value of the multipliers (e.g., a value of 2× that increases to 3×, 4×, etc) is the progressing variable of the multipliers game parameter.

The multipliers can multiply an award on any pays (e.g., on any winning paylines) containing the multiplier. The multiplier can be shown, for example, as a watermark or a superimposed indicia on an existing symbol position.

Positional Game Modifiers—Extra Wilds

According to another positional game modifier, an extra wilds game parameter (also referred to as wilds or extra wilds) generally designates a particular position and causes a regular reel symbol, such as a “cherry” symbol, at that designated position to become a wild symbol that can substitute for one or more of the other reel symbols. For example, in the event that (a) the player achieves a combination of consecutive “3-bars,” “3-bars,” and “1-bar” symbols, and (b) and the extra wilds game parameter causes the “1-bar” symbol to become a wild symbol, then (c) the wild “1-bar” symbol would represent a “3-bars” symbol, and the player would be awarded a payout for achieving a combination of three “3-bars” symbols. This combination generally provides a larger payout than the initial combination. The number of extra wilds is the progressing variable of the extra wilds parameter.

Figure 12:
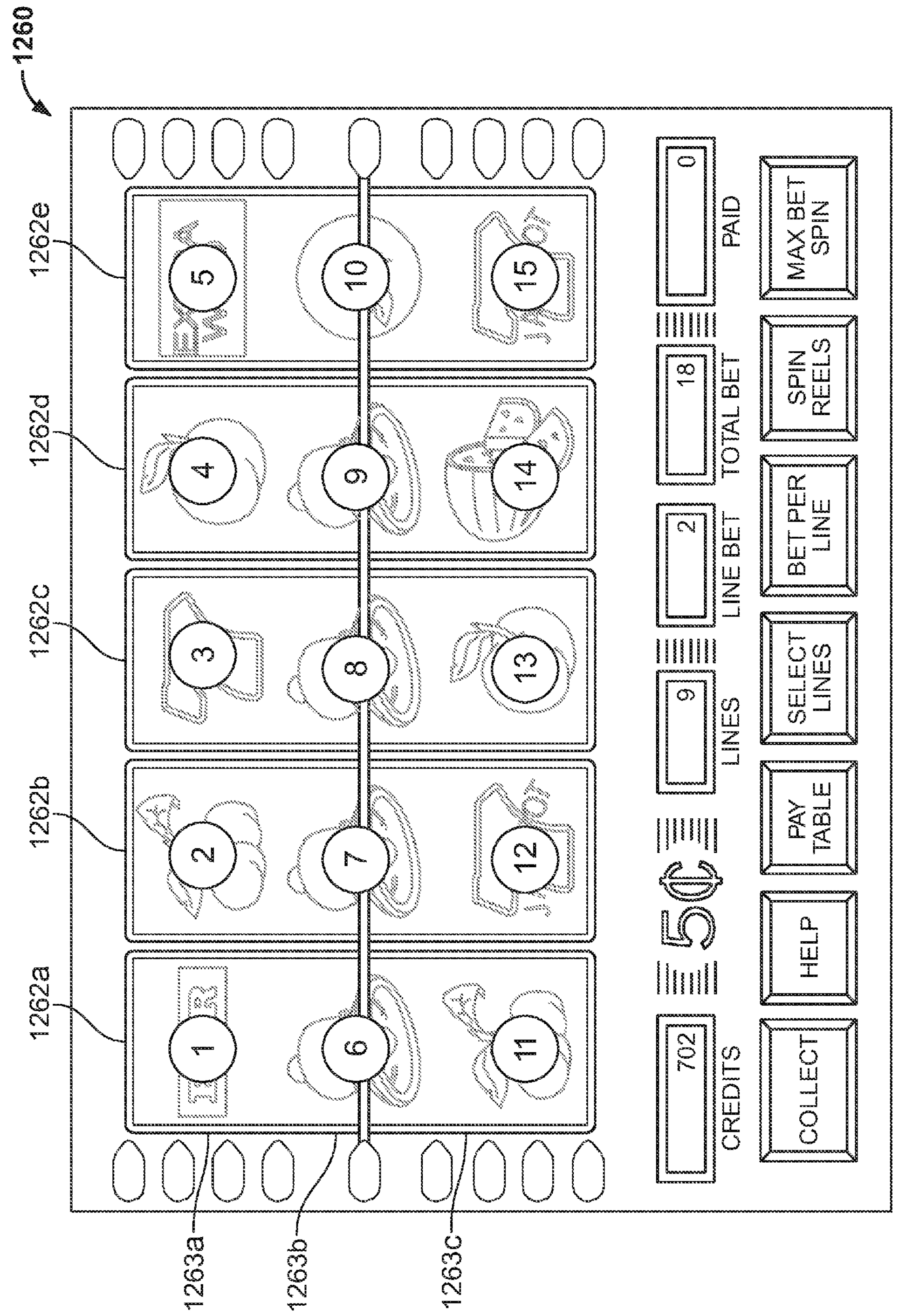
FIG. 12 illustrates an assignment of extra wilds positions on a reel display for a single free spin, according to an alternative embodiment of the present invention.

Referring to FIGS. 12 and 13, when a plurality of extra wilds are awarded to be received during a plurality of free spins, the extra wilds may be assigned to the free spins in accordance with a matrix-position method. For example purposes, it is assumed that a player wins a progressive award of 50 extra wilds that are to be awarded during 10 free spins, and that the free spins are being played on a machine having a typical 5-reel matrix arrangement of 3 rows by 5 columns.

As illustrated in FIG. 12, a basic-game screen 1260, which can be displayed on the primary display area 14 or a portion thereof, has 5 reels 1262*a*-1262*e*. Each of the reels 1262*a*-1262*e* has a respective one of a top displayed position 1263*a*, a center displayed position 1263*b*, and a bottom displayed position 1263*c*. The total number of displayed positions, per spin, is 15 positions (i.e., 3 rows×5 columns=15 positions). Each one of the 15 displayed positions is assigned a number, as illustrated. For example, the top position 1263*a* of a first reel 1262*a* is assigned position "1," the top position 1263*a* of the a second reel 1262*b* is assigned position "2," and so on.

As illustrated in FIG. 13, for the 10 free spins, the overall total of displayed positions is 150 positions (i.e., 15 positions/spin×10 free spins=150 positions). The first 15 displayed positions (1-15) are corresponding to the first free spin, the next 15 displayed positions (16-30) are corresponding to the second free spin, and so on. Based on the overall total, the 50 extra wilds are randomly assigned to different ones of the 150 displayed positions. For example, if an extra wild is randomly assigned to position 16, it will be awarded to the player during the second free spin in the respective position in the 5-reel matrix (e.g., the top position 1263*a* of the first reel 1262*a*).

According to an alternative embodiment, the extra wilds are weighted such that the player is awarded more extra wilds at the end of the free spins. For example, it is assumed that the player is awarded 10 extra wilds that are randomly assigned to 10 free spins. The initial random assignment of the 10 extra wilds may be as follows:

| Initial Spin | Extra Wilds |
|---|---|
| 1$^{st}$ Spin | 4 extra wilds |
| 2$^{nd}$ Spin | 0 extra wilds |
| 3$^{rd}$ Spin | 3 extra wilds |
| 4$^{th}$ Spin | 0 extra wilds |
| 5$^{th}$ Spin | 2 extra wild |
| 6$^{th}$ Spin | 0 extra wilds |
| 7$^{th}$ Spin | 1 extra wilds |
| 8$^{th}$ Spin | 0 extra wilds |
| 9$^{th}$ Spin | 0 extra wilds |
| 10$^{th}$ Spin | 0 extra wilds |

Based on the decrease in the number of extra wilds awarded, the player may feel discouraged as the game progresses and less enthusiastic to continue playing. As such, to provide a sense of encouragement and satisfaction, the spins may be reordered to achieve a climax in the number of extra wilds being awarded.

After reordering the spins, the assignment of the extra wilds may be as follows:

| New Spin | Initial Spin | Extra Wilds |
|---|---|---|
| 1$^{st}$ Spin | 2$^{nd}$ Spin | 0 extra wilds |
| 2nd Spin | 4$^{th}$ Spin | 0 extra wilds |
| 3rd Spin | 7$^{th}$ Spin | 1 extra wilds |
| 4th Spin | 6$^{th}$ Spin | 0 extra wilds |
| 5$^{th}$ Spin | 5$^{th}$ Spin | 2 extra wild |
| 6$^{th}$ Spin | 8$^{th}$ Spin | 0 extra wilds |
| 7$^{th}$ Spin | 3$^{rd}$ Spin | 3 extra wilds |
| 8$^{th}$ Spin | 9$^{th}$ Spin | 0 extra wilds |
| 9th Spin | 1$^{st}$ Spin | 4 extra wilds |
| 10$^{th}$ Spin | 10$^{th}$ Spin | 0 extra wilds |

The reordered spins progress the player through 1 extra wild awarded in the 3$^{rd}$ spin, 2 extra wilds awarded in the 5$^{th}$ spin, 3 extra wilds awarded in the 7$^{th}$ spin, and 4 extra wilds awarded in the 9$^{th}$ spin. The player is likely to anticipate with excitement each additional spin as the number of awarded extra wilds continues to increase throughout the free spins.

To avoid a scenario in which a subsequent extra wild is assigned to the same position as a previous extra wild (e.g., extra wild 5 and extra wild 25 are both assigned to position 16), the assignment can be rejected outright (i.e., not allowed). Alternatively, if two extra wilds are assigned to the same position, for any additional extra wild that is assigned to the same position as a previous extra wild, a multiplier can increase in accordance with the number of extra wilds. For example, 2 extra wilds assigned to the same position would multiply a winning outcome including that position by a 2× multiplier (e.g., a payout of 10 credits for a winning outcome would become 20 credits).

If the number of extra wilds is greater than the number of available positions, additional free spins can be added to accommodate the number of extra wilds. For example, referring to the above example, if there are 200 extra wilds that are awarded, and only 150 positions are available based on the 10 free spins, 4 more spins can be added to increase the number of available positions to 210 positions (150 positions+(4 spins×15 positions per spin))=210 positions). Alternatively, the number of extra wilds can be determined such that it is never greater than the number of available positions. Alternatively yet, if the number of extra wilds is greater than the number of available positions, the additional extra wilds can double up on a position to provide a multiplier increase (as explained above).

The extra wilds can be applied to a game in various ways. As described above, according to one embodiment, each one of the extra wilds is assigned to a specific displayed position on the displayed array of symbols. For example, an extra wild may be assigned to position "2" (which is in the top position 1263*a* of the second reel 1262*b*). Thus, only the cherry symbol of position "2" will become wild based on the respective assignment of the one extra wild. In other words, no other symbols—except for the symbol of position "2"—will become wild based on the specific extra wild that is being assigned.

According to an alternative embodiment, each displayed symbol that is the same as the symbol at a specific position assigned with an extra wild will also be deemed wild. For example, referring to the above example, an extra wild assigned to position "2" will result in every cherry symbol (which is the symbol of position "2") being wild. Accordingly, the symbols of positions "2" and "11" (which currently show cherry symbols) will become wild.

According to another alternative embodiment, a symbol position of the total existing number (not just displayed ones) of reel symbol positions is assigned an extra wild symbol. For example, each one of the reels 1262*a*-1262*e* includes numerous symbol-bearing positions, most of which are not displayed to the player at the same time. For example, each reel can have 50 symbol-bearing positions, only three of which are displayed to the player at one time in the display area. When assigning the awarded number of extra wilds, each of the extra wilds can be randomly assigned to one of the total number of reel symbol-bearing positions, thereby replacing or transforming the existing symbol at the assigned position to a wild. According to this example, the number of possible positions per spin is dramatically increased in accordance with the number of total reel positions. Assuming that each reel 1262*a*-1262*e* has 50 symbol-bearing positions, the number of possible positions per spin would increase to 250 positions (=50 positions/reel multiplied by 5 reels), which, in turn, would result in 2,500 positions for a total of 10 free spins.

According to yet another alternative embodiment, instead of randomly assigning an extra wild to an existing position on one of the reels (and thereby replacing or transforming a symbol at that position to a wild), an extra wild can be added to a newly created position on one of the reels. Thus, if a reel initially has a total of 50 symbol-bearing positions, a 51st position is added to the reel and assigned as an extra wild symbol. In other words, the reel is being expanded by one or more positions bearing extra wild symbols.

As described above, the extra wild symbols can be randomly assigned to the displayed positions, can be added to new positions on the reel strips (i.e., added symbols), or can be substituted for existing positions on the reel strips (i.e., replaced symbols). Additional examples of replacing non-wild symbols with wild symbols are disclosed in PCT Patent Application No. PCT/US2008/007730 filed Jun. 20, 2008, titled "Wagering Game With Persistent Wild Symbol Reel Positions," which is incorporated herein by reference in its entirety.

Positional Game Modifiers—Non-Wild Special Symbols

According to another positional game modifier, the modifier can be in the form of non-wild special symbols. For example, a non-wild special symbol can be a top-pay symbol that increases the likelihood of high pays during the free spins. The non-wild special symbols, or any other positional game modifiers, can be assigned similar to any of the different alternative assignment approaches described above in reference to extra wild symbols.

Positional Game Modifiers—Payline Activator Symbols

According to another positional game modifier, the modifier can be in the form a payline activator. The payline activator, for example, activates right-to-left pays on any paylines containing the payline activator. Typically, paylines are evaluated from left-to-right, requiring a winning combination to start from the leftmost reel. The payline activator symbol would allow the paylines on which the activator symbol appears to be evaluated from right to left such that a winning combination can start from the rightmost reel.

Picks

A picks game parameter generally provides a player with a number of picks during a game. The number of picks is the progressing variable of the picks game parameter. For example, the player may be awarded 10 picks in a pick-field, wherein the player can pick (or select) 10 items displayed in the pick-field (e.g., each pick opens a treasure chest). If the number of picks exceeds the number of pick-fields, the player can be provided with a new pick-field or can be awarded all the awards in the current pick-field.

Alternatively, the game parameter is directed to a Bingo-type or a Keno-type game in which the number of picks are not selected by the player, but by a controller. In an exemplary Bingo embodiment, the player has one or more cards printed with differently numbered squares. When a number is drawn by the controller, such as by drawing a ball from a hopper, the player places a marker on a respective square of the cards. A winning outcome is achieved if the player is successful in completing a specific pattern on the cards. The progressive variable can be either the number of drawn numbers or the number of cards. If the number of drawn numbers is increased, it is more likely that the player can complete a pattern on the cards. If the number of cards is increased, it is more likely that the player can complete a pattern on at least one of the cards.

Paylines

Paylines are generally lines on a display of a gaming machine along which symbols from each reel must line up to achieve a winning outcome. The number of paylines available to a player can progress in accordance with the progressive award. For example, a player can win a 20 payline non-cash value progressive award, which can be provided on a slot game that would otherwise have only 5 paylines, thus, providing the player with a total over 25 paylines.

Rolls of Dice

Rolls of dice, whether physical or computer-based dice, are generally used to randomly determine a game outcome. When rolling a pair of dice, the player is provided with the appearance that he or she may somehow influence the outcome of the game. For example, in a Monopoly® theme game, the number on the rolled dice determines the number of spaces that a player may advance on the Monopoly® board. The more rolls of dice that the player may have, the more outcomes that the player may receive. The numbers of rolls available to the player is the progressing variable of the rolls of dice game parameter.

Loyalty Points

Loyalty points are generally provided by a gaming establishment to encourage players to return to the gaming establishment often and play for long periods of time. The player can redeem the loyalty points for various rewards, e.g., free buffet, free hotel nights, etc. The number of loyalty points is the progressing variable of the loyalty points game parameter.

Wins

The number of wins can progress in accordance with another game parameter. For example, the player may spin until an X number of wins has occurred (e.g., until the player wins 20 times). In another example, the player can play a free spin round until a specific winning outcome has been won X number of times. The greater the number X, the more wins the player will achieve.

Time

Another game parameter can be time related to gameplay. For example, the progressing variable can be time available for any game, such as a picking game, a bonus game, a racing game, a Monopoly® theme game, a Top Gun® theme game, etc. Optionally, the player can engage in gameplay that allows the player to play as much as he or she can within the allotted time.

Pooper Savers

In some games, players encounter game-ending outcomes to terminate gameplay for a particular game. These game-ending outcomes are also referred, for example, as poopers, especially when playing a party game such as Jack Box Party game. To avoid a pooper event, players can use a pooper saver that will nullify an event that will otherwise be considered a game-ending event, thereby extending gameplay. The number of pooper savers is the progressing variable for this type of game parameter.

Games

The number of games available to a player may progress as the variable of a games game parameter. For example, in a poker game, in which each hand can be considered to be a separate game, the player may play an additional number of hands in addition to an initial hand. The number of hands can be the progressing variable for this type of game parameter.

Cascading Event

A cascading event is generally directed to a slot reel gameplay whereby symbols fall into place from the top of the screen instead of landing in place as the reels stop one by one. For example, if the player receives a winning symbol combination on the reels, the positions with the winning symbols are vacated and all the symbols above those positions cascade (or shift/fall) downwards to fill the vacated positions. The blank positions on top are now filled with new symbols. The cascading process may repeat itself, during the same spin, until there are no more winning combinations. Thus, there may be multiple cascades in a single cascading event.

For additional information regarding cascading events, the reader is referred to commonly-assigned United States Patent Application Publication No. 2004/003829 A1 ("the '829 Publication"), titled "Symbol Matching Gaming Machine" and filed Aug. 19, 2002, which is incorporated herein by reference in its entirety. One exemplary embodiment directed to a cascading event is described in reference to FIGS. 13-20 of the '829 Publication. The progressing variable in the cascading event parameter is the number of cascading events, In a preferred embodiment, a single cascading event is any spin that results in at least one cascade. For example, upon spinning a set of reels, the player achieves a cascading event if an outcome has a set of winning symbols that are vacated and, as a result, the symbols above the winning symbols' positions cascade downwards. Other cascades occurring during the same spin, subsequent to the outcome in which a first cascade has occurred, are considered to be part of the same cascading event. In contrast, a spin that does not result in at least one cascade is not considered to be a cascading event.

Spinning Streaks

A spinning streaks event, also referred to as a bonus respin event, is generally directed to improving a winning combination by repeatedly spinning until the player no longer improves the winning combination. For example, the player spins a set of reels in which each symbol position is an independent spinning reel. If a winning combination is achieved, the symbols of the winning combination remain in place and the remaining reels (i.e., symbols) spin again to determine whether an improved, or better, winning combination is achieved (e.g., whether a 4-Cherry symbol combination is achieved instead of a 3-Cherry symbol combination). According to one embodiment, the player continues to spin the reels until the winning combination is no longer improved. Alternatively, non-winning reels may respin until all the symbols on all the reels form part of a winning combination.

The player may have multiple spins in a spinning streaks event. The progressing variable is the number of spinning streaks events. For additional information regarding spinning streaks events, the reader is referred to commonly-assigned International Application Publication No. WO 2009/005702 A1, titled "Wagering Game Having Hybrid Winning Outcomes" and published Jan. 8, 2009, which is incorporated herein by reference in its entirety.

In a preferred embodiment, a spinning streak event occurs only when a winning combination occurs during a single spin or during immediately subsequent spins. In other words, if the player achieves a winning outcome during a single spin, the spin with the winning outcome is deemed to be a single spinning streak event. Additional spins with winning outcomes, which occurs immediately subsequent to the initial spin, are also considered to be part of the single spinning streak event. Thus, the spinning streak event ends when a spin fails to result in a winning outcome (i.e., breaking the streak of winning outcomes). For example, if the player achieves a first winning outcome in a first spin, the player has achieved a first spinning streak (which is currently at one winning outcome). If a second winning outcome is achieved in a second (immediately subsequent) spin, the second winning outcome is considered part of the first spinning streak (which is currently at two winning outcomes). If a third spin (immediately subsequent to the second spin) does not result in a winning outcome, the first spinning streak ends with a streak of two winning outcomes. If a fourth spin (immediately subsequent to the third spin) results in a third winning outcome, the third winning outcome is considered to be part of a second spinning streak (which is currently at one winning outcome).

Random Bonuses

Another game parameter can be random bonuses, wherein a number of random bonuses is awarded to the player. For example, a player may be awarded an X number of bonus games that are selected from a group including, e.g., a cascading bonus game, a spinning streak bonus game, etc. The progressive variable of this game parameter is the number (X) of random bonus games.

Buildings

When playing a Monopoly® theme game, the player may be awarded a non-cash progressive award directed to the number of buildings used on the Monopoly® board. For example, the player may be generally awarded a building selected from different levels (or types) of buildings, including a house, a hotel, or a skyscraper. Awarding the player an X number of buildings provides the player with an increased likelihood of receiving an increased award. The more buildings the player has on the Monopoly® board, the greater the award that the player may receive. The progressing variable is the X number of buildings.

The number of awarded buildings can be selected from a plurality of building types. For example, if the player is awarded a progressive award of 10 buildings, the player can be awarded 4 houses, 4 hotels, and 2 skyscrapers. The awarded buildings can be revealed to the player prior to placement on the Monopoly® board or can be mystery buildings, which are revealed to the player after or at the time of placement on the Monopoly® board.

Optionally, the awarded buildings can be randomly selected. For example, a first time the buildings are awarded the player receives an X number of houses, but a second time the player receives an X number of hotels. Alternatively, the player can select the type of building that is preferred, e.g., houses or hotels. In this embodiment, the X number of buildings will vary so that the player receives substantially the same value. For example, if the player selects houses the player may receive 8 houses, but if the player selects hotels the player will receive 2 hotels (assuming that 1 hotel is the substantial equivalent to 4 houses). For additional information regarding Monopoly® theme games, the reader is referred to commonly-assigned U.S. Pat. No. 6,315,660 B1, titled "Gaming Machines With Board Game Theme" and issued Nov. 13, 2001, which is incorporated herein by reference in its entirety.

Nudges

The game parameter may be directed to a number of nudges. In general, if a symbol combination is a near-miss (e.g., the symbol combination is one symbol away from a winning combination), the appropriate symbol is moved to the respective payline to achieve the winning combination. For example, a payline may currently include 2 Cherry symbols in a game in which 3 Cherry symbols are necessary for achieving a winning combination. If a third Cherry symbol is in an adjacent position to the payline (but not on the payline), the third Cherry symbol will get shifted up or down (or nudged) to the payline to achieve the winning combination. The progressing variable in this game parameter is the number of single nudges, wherein a single shift in position is a single nudge.

Random Mystery Enhancements

The game parameter can be directed to a plurality of random mystery enhancements. According to an exemplary embodiment, a player may receive a number of random mystery enhancements represented by a number of awarded penguins. During any play of a base game on a slot machine, a lucky penguin can pop on the screen at any time and provide a gameplay enhancement that can modify the outcome of the game. For example, the lucky penguin can modify the outcome of the game by adding one or more extra wilds, cascading events, a pooper savers, multipliers, etc. The occurrence of the lucky penguin appears to be an entirely random, and unexpected, event to player. The number of lucky penguins, or random mystery enhancements, is the progressing variable of this game parameter. For additional information regarding this type of enhancements, the reader is referred to commonly-assigned International Application Publication No. WO 2009/058271, titled "Gaming System With Play Enhancement Icons" and published May 7, 2009, which is incorporated herein by reference in its entirety.

Reject/Accept Options

In a Let's Make A Deal® type of bonus game, the player can accept an award, or reject the award hoping that a better award may be subsequently awarded. For example, the player may receive a 10 credit award, which the player may reject in return for receiving whatever is hidden behind a closed door (e.g., no award or a 100 credit award). Increasing the number of opportunities that the player can reject or accept an award may increase the likelihood of received a greater award. The progressing variable in this game parameter is the number of opportunities in which the player can reject or accept the award.

Locked Reels

When playing a reel game, one or more reels can be locked in a favorable position for an X number of times. While those reels are locked, the remaining reels are spinned for the X number of times. The player receives any wins that are achieved during the X number of times. The progressing variable in this game parameter is the X number of times.

Bonus Games

Another exemplary embodiment of the game parameter is directed to a progressive number of times that the player can play a bonus game. In other words, the player can repeat the bonus game X number of times, in accordance with the awarded non-cash value of the progressive award. The bonus game can be any type of bonus game.

Assigning Attributes to Plays for Increasing EV

Figure 14:
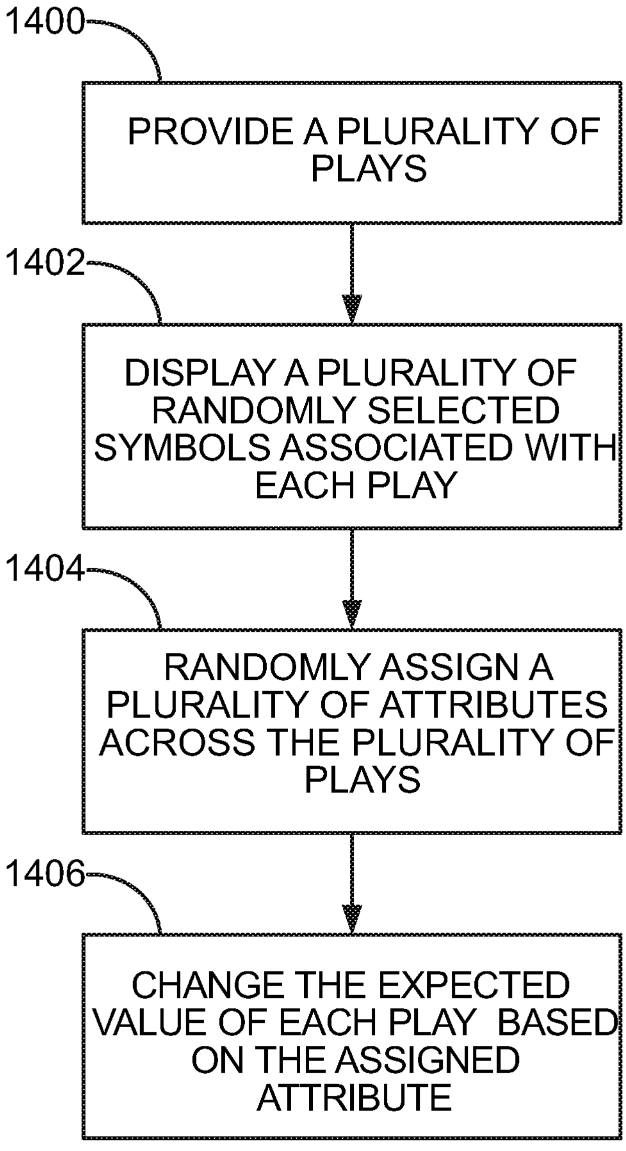
FIG. 14 illustrates a method for providing attributes across a plurality of plays.

Referring to FIG. 14, a method of conducting a wagering game is generally directed to assigning attributes across a plurality of plays, the attribute assignment causing a change in an expected value (EV) of a particular play of the wagering game. The method of assigning attributes is generally similar to the method of assigning positional game modifiers (described above), except that the assignment of the attributes is not directed to any particular position. In other words, one difference between the attribute assignment and the positional game modifiers assignment is that the attributes are assigned to a particular play independently of any particular position.

When conducting the method for assigning attributes across the plurality of plays, the player is provided with a plurality of plays (1400), and, for each play, a plurality of randomly selected symbols are displayed (1402). The player receives a plurality of attributes, which are randomly assigned across the plurality of plays (1404). The attributes can be of the same type or of different types. The expected value of each play changes (e.g., increases) based on the assigned attribute (1406).

According to one embodiment, a predetermined number of X attributes are received by the player and assigned to a Y plurality of plays. The X attributes are assigned to the Y plays before the player begins playing the Y plays. Eventually, all X attributes are used within the given Y number of plays.

In general, the expected value is the average value that a player expects to win per bet if bets with identical odds are repeated many times. For example, if a game has a theoretical payback percentage of 90% (meaning that for every dollar wagered, the game on average returns 90 cents to the player), the expected value per bet of one dollar is 90 cents. In other words, the expected value is generally referred to what the player can expect to win or lose if the player were to play many times with the same bet. Thus, the expected value is the average amount of money that a particular wager would win over a long period of time.

The plurality of plays can be triggered in response to a mystery or symbol-based trigger occurring during play of an underlying base game, and can include spins of symbol-bearing reels and hands of poker. Optionally, the player can provide a wager for each of the plurality of plays.

As an example of the method for assigning attributes across a plurality of plays, a player is awarded two multipliers (i.e., two attributes) and ten free spins (i.e., ten plays). The two multipliers are randomly assigned to be received by the player across the ten free spins. For example, the player may randomly receive a first multiplier during the third free spin, and a second multiplier during the ninth free spin.

Attributes that can change the expected value of a play can include any of the applicable exemplary game parameters described above (e.g., free spins and positional game modifiers, including wilds, non-wild special symbols, multipliers, and payline activator symbols). Other examples of attributes can include "power ups," bonus features, "win warp" features, and "trap-a-tribble" bonus, as described in more detail below.

One exemplary attribute is in the form of a "power up," which is generally an enhancement to a free spin. When the player is awarded an X number of "power ups," the "power ups" are randomly assigned across a Y plurality of free plays. For example, the player may receive ten (10) "power ups" that are randomly assigned across five (5) free plays. Randomly, two "power ups" are assigned to each one of the five (5) free plays. Thus, according to this example, each time the player will play one of the free plays, the player will also receive (and play) two "power ups."

The enhancement of the free spins is based on different types of "power ups," such as a bonus "booster power up," a "wilds power up," a "random reels wild power up," a "win multiplier power up," and a "scatter spin power up." When the bonus "booster power up" is active, any bonus-booster symbol on the reels triggers a bonus. When a "wilds power up" is active, all symbols of a certain kind will transform to wilds and substitute for all other symbols. Optionally, any winning combination that contains one or more wilds pay double. When a "random reels wild power up" is active, one or more reels will be wild.

When a "win multiplier power up" is active, all wins will be multiplied by a multiplier (e.g., 2×-10×). If a bonus is triggered while this "power up" is active, the bonus won will also be multiplied. When a "scatter spin power up" is active, all wins will be evaluated as scatter pays, with no paylines being evaluated. Optionally, scatter pays are evaluated reel by reel, with only one symbol per reel being included.

Various bonus features can also increase the expected value of a specific play to which they are assigned. The bonus features are directed to a wagering game having a plurality of reels. For example, a bonus feature is a "Magic Mayhem" bonus feature, which randomly applies X number of re-spins to win over Y number of free spins. For example, if a win occurs on a particular spin and the "Magic Mayhem" enhancement is applied to this spin, the win would be repeated. If the spin was a loss, the "Magic Mayhem" for this spin would have no effect.

Another bonus feature is a "Magic Nudge" bonus feature, which randomly applies X number of nudges over Y number of spins. The "Magic Nudge" converts a near-miss symbol combination to a winning combination by shifting one or more symbols of a combination that is almost aligned along a payline (e.g., a winning symbol is within one position up or down from the payline) to the payline. Thus, the "Magic Nudge" converts a losing combination to a winning combination. For example, if a near-win symbol combination appears on a spin and the "Magic Nudge" enhancement is applied to this spin, the player would receive the winning combination. Without the "Magic Nudge" enhancement, the player would not receive the winning combination.

Yet another bonus feature is a "Presto" bonus feature, which randomly applies X number of win upgrades over Y number of spins. For example, if a winning combination appears on a spin and the "Presto" enhancement is applied to this spin, the player would receive a better winning combination (i.e., the initial winning combination is upgraded to the better winning combination).

Yet another bonus feature is a "pay Z credits" bonus feature, which randomly applies X number of "pay Z credits" over Y number of spins. For example, if this enhancement is applied to a spin the player will receive Z credits (e.g., 20 credits).

A "win warp" feature awards one or more random bonuses at the end of an assigned play. The random bonuses can be randomly selected from a group of different types of bonus, such as any of the bonuses described above (e.g., "wilds power up," "random reels wild power up," etc.). The "win warp" feature randomly applies X number of random bonuses over Y number of spins. The random bonuses can be of the same type or of different types. For example, a player is awarded ten random bonuses that are received over ten free spins. The player may receive a random bonus of type A (e.g., a "wilds power up" bonus) after a first spin and a random bonus of type B (e.g., a "random reels wild power up") after a second spin. The applied bonus can be randomly selected, for example, from a group consisting of types A, B, and C. Optionally, all the random bonuses are only of a single type (e.g., type A).

A "Trap-a-Tribble" bonus is directed to providing a special symbol on the reels. Each time the special symbol lands on the reels, a credit value award and/or a multiplier change occurs. The multiplier can be a free spins multiplier that multiplies a winning award of a corresponding spin. This bonus randomly applies X number of special symbols over Y number of spins.

For example, a player receives as an attribute five occurrences of the "Trap-a-Tribble" bonus (or, in other words, five occurrences of the special symbol). The five occurrences are randomly assigned to ten free spins. For simplicity, it is assumed that each of the five occurrences of the "Trap-a-Tribble" bonus is assigned sequentially to every other one of the free spins (i.e., a first "Trap-a-Tribble" bonus is assigned to a second free spin, a second "Trap-a-Tribble" bonus is assigned to a fourth free spin, and so on until a fifth (or last) "Trap-a-Tribble" bonus is assigned to a tenth (or last) free spin).

Still referring to the above example, each time the special symbol lands anywhere on the reels, the player is awarded two credits, for a total of ten credits. After the special symbol has landed three times, a free spin multiplier increases from a 1× value to a 2× value. Thus, in the eighth spin (when the special symbol has landed for the fourth time), the player will receive two credits and a multiplier increase of 2×. For the eighth spin, the player will receive at least a total award of four credits—the two credits multiplied by the 2× multiplier.

In other embodiments, the multiplier can further increase based on additional special symbols landing on the reels. For example, after six special symbols landing on the reels, the multiplier increases to 3×; after ten special symbols landing on the reels, the multiplier increases to 5×; and after fifteen symbols landing on the reels, the multiplier increases to 10×.

In alternative embodiments, the player may further receive other bonuses based on the number of times that the special symbol has landed on the reels during a particular spin. For example, if three special symbols land scattered on the reels during a particular spin (e.g., during a first spin), the player receives eight extra free spins. In other examples, four special symbols landing scattered on the reels provide twelve extra free spins, and five special symbols provide twenty extra free spins.

Each of these embodiments and obvious variations thereof is contemplated as falling within the spirit and scope of the claimed invention, which is set forth in the following claims.

What is claimed is:

1. A computer-implemented method for conducting wagering games on a wagering game system, the wagering game system including one or more input devices, one or more display devices, and one or more processors, the method comprising:

initially awarding, via at least one of the one or more processors, a plurality of plays N of the wagering game and a predetermined number of positional game modifiers X, the plurality of plays N including play N1 and play N2 and the predetermined number of positional game modifiers X including modifier X1 and modifier X2, each play of the plurality of plays N including a set of assignable positions M such that a plurality of assignable positions M×N occurs across the plurality of plays N;

displaying, on at least one of the one or more display devices, a plurality of randomly selected symbols in a least some of the assignable positions M for each play of the plurality of plays N;

randomly assigning, via at least one of the one or more processors, the predetermined number of positional game modifiers X across the plurality of plays N to positions in the plurality of assignable positions M×N, the predetermined number of positional game modifiers X being assigned such that each of modifier X1 and modifier X2 is assignable to play N1 or play N2; and in response to assigning all modifiers of the predetermined number of positional game modifiers X across the plurality of plays N, including modifier X1 being assigned to either of play N1 or play N2 and modifier X2 being assigned to either play N1 or play N2, determining, via at least one of the one or more processors, an outcome for each play of the plurality of plays N taking into account any positional game modifiers X assigned to the assignable positions M.

2. The method of claim 1, wherein the predetermined number of positional game modifiers X is a progressive award that increments in response to one or more processor-controlled wagering games or gaming devices linked to the progressive award, and wherein the awarding of the predetermined number of positional game modifiers X occurs in response to a triggering event.

3. The method of claim 1, wherein the predetermined number of positional game modifiers X is selected from a group consisting of wilds, non-wild special symbols, and multipliers.

4. The method of claim 1, wherein the set of assignable positions M in each play of the plurality of plays N is an array of fixed display positions, and wherein each play of the plurality of plays N includes a spin of symbol-bearing reels that are rotated and stopped to randomly place symbols on the reels in visual association with the fixed display positions in the array.

5. The method of claim 1, wherein the set of assignable positions M in each play of the plurality of plays N is distributed among a plurality of symbol-bearing reels that are rotated and stopped to randomly place a subset of the symbols on the reels in visual association with a display area on at least one of the one or more display devices.

6. A computer-implemented method for conducting wagering games on a wagering game system, the wagering game system including one or more input devices, one or more display devices, and one or more processors, the method comprising:

receiving a wager in response to an input via at least one of the one or more input devices;

awarding, via at least one of the one or more processors, a progressive award including a plurality of positional game modifiers X, the plurality of positional game modifiers X including modifier X1 and modifier X2;

assigning, via at least one of the one or more processors, the positional game modifiers X to a total number of symbol-bearing positions M×N achieved during a plurality of awarded free plays N including play N1 and N2, each play of the plurality of awarded free plays N having a set of assignable symbol-bearing positions M, the plurality of positional game modifiers X being assigned such that each of modifiers X1 and modifier X2 is assignable to play N1 or play N2;

displaying the plurality of free plays N on at least one of the one or more display devices; and determining, via at least one of the one or more processors, an outcome for each play of the plurality of awarded free plays N, the outcome being based on any positional game modifiers X assigned to symbol-bearing positions M of each play of the plurality of awarded free plays N, including modifier X1 being assigned to either of play N1 or play N2 and modifier X2 being assigned to either play N1 or play N2.

7. The method of claim 6, wherein the progressive award increments in response to one or more processor-controlled wagering games or gaming devices linked to the progressive award, and wherein the awarding of the progressive award occurs in response to a triggering event.

8. The method of claim 6, wherein the plurality of positional game modifiers X is selected from a group consisting of wilds, non-wild special symbols, multipliers, and payline activator symbols.

9. The method of claim 6, wherein the assigning of the positional game modifiers X to a total number of symbol-bearing positions M×N includes randomly assigning.

10. The method of claim 6, wherein each set of assignable symbol-bearing positions M is displayed in the form of an array of fixed display positions, and wherein each play of the plurality of awarded free plays N includes a spin of reels that are rotated and stopped to randomly place symbols on the reels in visual association with the fixed display positions of the array.

11. The method of claim 6, wherein, the set of assignable symbol-bearing positions M in each play is distributed among a plurality of symbol-bearing reels that are rotated and stopped to randomly place a subset of symbols on the reels in visual association with a display area of at least one of the one or more input device.

12. A gaming system comprising:

a wager input device configured to receive a wager from a player for playing a wagering game;

a display configured to display a plurality of plays N of the wagering game, each play including a set of assignable positions M such that a plurality of assignable positions M×N occurs over the plurality of plays N, at least some of the assignable positions M bearing symbols; and one or more processors communicatively coupled to the display, at least one of the processors being operative to initially award the plurality of plays N and a predetermined number of positional game modifiers X, the plurality of plays N including play N1 and play N2 and the predetermined number of positional game modifiers including modifier X1 and modifier X2, randomly assign the predetermined number of positional game modifiers X to the plurality of assignable positions M×N across the plurality of plays N, the predetermined number of positional game modifiers X being assigned such that each of modifier X1 and modifier X2 is assignable to play N1 or play N2, and in response to assigning all modifiers of the predetermined number of positional game modifiers X across the plurality of plays N, including modifier X1 being assigned to either of play N1 or play N2 and modifier X2 being assigned to either play N1 or play N2, determine an outcome for each play of the plurality of plays N taking into account any positional game modifiers X assigned to the assignable positions M.

13. The gaming system of claim 12, wherein the predetermined number of positional game modifiers X is a progressive award that increments in response to one or more processor-controlled wagering games or gaming devices linked to the progressive award, and wherein the awarding of the predetermined number of positional game modifiers X occurs in response to a triggering event.

14. The gaming system of claim 12, wherein the predetermined number of positional game modifiers X is selected from a group consisting of wilds, non-wild special symbols, multipliers, and payline activator symbols.

15. The gaming system of claim 12, wherein the set of positions in each play is an array of fixed display positions, and wherein each play includes a spin of symbol-bearing reels that are rotated and stopped to randomly place the symbols on the reels in visual association with the display positions in the array.

* * * * *